US007626940B2

(12) United States Patent
Jain

(10) Patent No.: US 7,626,940 B2
(45) Date of Patent: *Dec. 1, 2009

(54) SYSTEM AND METHOD FOR INTEGRATED HEADER, STATE, RATE AND CONTENT ANOMALY PREVENTION FOR DOMAIN NAME SERVICE

(75) Inventor: Hemant Kumar Jain, Los Gatos, CA (US)

(73) Assignee: IntruGuard Devices, Inc., Sunnyvale, CA (US)

( * ) Notice: Subject to any disclaimer, the term of this patent is extended or adjusted under 35 U.S.C. 154(b) by 932 days.

This patent is subject to a terminal disclaimer.

(21) Appl. No.: 11/158,317

(22) Filed: Jun. 20, 2005

(65) Prior Publication Data
US 2006/0146816 A1 Jul. 6, 2006

Related U.S. Application Data

(63) Continuation-in-part of application No. 11/021,637, filed on Dec. 22, 2004.

(51) Int. Cl.
*H04L 12/26* (2006.01)
*H04L 9/32* (2006.01)

(52) U.S. Cl. .................. 370/252; 713/168; 370/389; 370/428; 726/22; 726/26

(58) Field of Classification Search ............ 370/395.32, 370/395.4, 395.42, 241, 244, 252, 253, 245, 370/389, 428, 401, 469, 395.72, 232; 726/22, 726/26; 713/173, 122, 168, 188, 151, 150, 713/189, 194
See application file for complete search history.

(56) References Cited

U.S. PATENT DOCUMENTS

| 6,711,127 | B1 * | 3/2004 | Gorman et al. | ............. 370/230 |
| 6,904,057 | B2 * | 6/2005 | Sarkinen et al. | ............. 370/469 |
| 6,928,549 | B2 * | 8/2005 | Brock et al. | ................. 713/194 |
| 6,944,168 | B2 * | 9/2005 | Paatela et al. | ................ 370/401 |
| 6,944,678 | B2 * | 9/2005 | Lu et al. | ...................... 709/245 |
| 7,006,505 | B1 * | 2/2006 | Bleszynski et al. | ..... 370/395.72 |

(Continued)

FOREIGN PATENT DOCUMENTS

EP 0493892 A2 * 7/1992
WO WO 0078004 A2 * 12/2000

OTHER PUBLICATIONS

A multi-agent based system for intrusion detection; Hegazy, I.M.; Al-Arif, T.; Fayed, Z.T.; Faheem, H.M.; Potentials, IEEE vol. 22, Issue 4, Oct.-Nov. 2003, pp. 28-31.*
Architecture for a hardware-based, TCP/IP content-processing system; Schuehler, D.V.; Moscola, J.; Lockwood, J.W.; Micro, IEEE vol. 24, Issue 1, Jan.-Feb. 2004 pp. 62-69.*
TCP-Stream reassembly and state tracking in hardware; Necker, M.; Contis, D.; Schimmel, D.; Field-Programmable Custom Computing Machines, 2002. Proceedings. 10th Annual IEEE Symposium on Apr. 22-24, 2002 pp. 286-287.*

(Continued)

*Primary Examiner*—Ayaz R Sheikh
*Assistant Examiner*—Salman Ahmed
(74) *Attorney, Agent, or Firm*—Lumen Patent Firm

(57) ABSTRACT

The present invention provides an integrated prevention of header, state, rate and content anomalies along with network policy enforcement for domain name service (DNS). A hardware-based apparatus helps identifying DNS rate-thresholds through continuous and adaptive learning. The apparatus can determine DNS header and DNS state anomalies and drop packets containing those anomalies. DNS queries and responses are inspected for known malicious contents using a Content Inspection Engine. The apparatus integrates advantageous solutions to prevent anomalous packets and enables a policy based packet filter for DNS.

21 Claims, 9 Drawing Sheets

U.S. PATENT DOCUMENTS

| | | | |
|---|---|---|---|
| 7,058,974 B1* | 6/2006 | Maher et al. | 726/13 |
| 7,082,117 B2* | 7/2006 | Billhartz | 370/338 |
| 7,150,044 B2* | 12/2006 | Hoefelmeyer et al. | 726/23 |
| 7,177,930 B1* | 2/2007 | LoPresti | 709/224 |
| 7,233,597 B2* | 6/2007 | Kumar et al. | 370/401 |
| 7,234,168 B2* | 6/2007 | Gupta et al. | 726/25 |
| 7,305,708 B2* | 12/2007 | Norton et al. | 726/23 |
| 7,308,715 B2* | 12/2007 | Gupta et al. | 726/23 |
| 7,386,733 B2* | 6/2008 | Yoon et al. | 713/189 |
| 7,409,714 B2* | 8/2008 | Gupta et al. | 726/23 |
| 7,411,957 B2* | 8/2008 | Stacy et al. | 370/392 |
| 7,424,744 B1* | 9/2008 | Wu et al. | 726/23 |
| 7,426,634 B2* | 9/2008 | Jain | 713/151 |
| 2002/0083175 A1 | 6/2002 | Afek et al. | 709/225 |
| 2002/0194469 A1* | 12/2002 | Dominique et al. | 713/150 |
| 2003/0004688 A1* | 1/2003 | Gupta et al. | 702/188 |
| 2003/0004689 A1* | 1/2003 | Gupta et al. | 702/188 |
| 2003/0009699 A1* | 1/2003 | Gupta et al. | 713/201 |
| 2003/0014662 A1* | 1/2003 | Gupta et al. | 713/200 |
| 2003/0041266 A1 | 2/2003 | Ke et al. | 713/201 |
| 2003/0070096 A1 | 4/2003 | Pazi et al. | 713/201 |
| 2003/0076848 A1 | 4/2003 | Bremler-Barr et al. | 370/412 |
| 2003/0097557 A1 | 5/2003 | Tarquini et al. | 713/153 |
| 2003/0105881 A1* | 6/2003 | Symons et al. | 709/249 |
| 2003/0110274 A1 | 6/2003 | Pazi et al. | 709/229 |
| 2003/0123447 A1 | 7/2003 | Smith | 370/394 |
| 2003/0123452 A1 | 7/2003 | Cox et al. | 370/395.43 |
| 2003/0149887 A1* | 8/2003 | Yadav | 713/200 |
| 2003/0204632 A1 | 10/2003 | Willebeek-LeMair et al. | 709/249 |
| 2003/0221013 A1* | 11/2003 | Lockwood et al. | 709/231 |
| 2004/0008681 A1* | 1/2004 | Govindarajan et al. | 370/394 |
| 2004/0114519 A1* | 6/2004 | MacIsaac | 370/232 |
| 2005/0044406 A1* | 2/2005 | Stute | 713/201 |
| 2005/0060557 A1* | 3/2005 | Lin | 713/188 |
| 2005/0086500 A1* | 4/2005 | Albornoz | 713/188 |
| 2005/0111460 A1* | 5/2005 | Sahita | 370/395.3 |
| 2006/0023709 A1* | 2/2006 | Hall et al. | 370/389 |
| 2006/0117386 A1* | 6/2006 | Gupta et al. | 726/23 |

OTHER PUBLICATIONS

Architecture for a hardware based, TCP/IP content scanning system [intrusion detection system applications]; Schuehler, D.V.; Moscola, J.; Lockwood, J.; High Performance Interconnects, 2003. Proceedings. 11th Symposium on Aug. 20-22, 2003 pp. 89-94.*

Network-based Intrusion Detection Model for Detecting TCP SYN flooding; U Kanlayasiri, S Sanguanpong—Proceedings of the 4 th National Computer Science 2000.*

Some approaches to information security of communication networks; S Avdoshin, V Serdiouk—Informatica-Ljubljana- , 2002.*

Network Management & Security; E Cheung—Network security, 2003.*

G. Iannaccone, S. Jaiswal and C. Diot, "Packet Reordering Inside the Sprint Backbone," Tech. Report, TR01-ATL-062917, Sprint ATL, Jun. 2001.

E. Blanton and M. Allman, "On Making TCP More Robust to Packet Reordering", ACM Computer Comm. Review, 32(1), Jan. 2002, pp. 20-30.

M. Laor and L. Gendel, "The Effect of Packet Reordering in a Backbone Link on Application Throughput," IEEE Network, Sep./Oct. 2002, pp. 28-36.

Girish P. Chandranmenon et al., "Reconsidering Fragmentation and Reassembly," Aug. 1, 1997, Washington University in St. Louis, pp. 1-23.

T. Banka, A. A. Bare and A. P. Jayasumana, "Metrics for Degree of Reordering in Packet Sequences," Proc. 27th IEEE Conference on Local Computer Networks, Nov. 2002, pp. 333-342.

J. Bellardo and S. Savage, "Measuring Packet Reordering," Proc. IMW'02, Nov. 2002, pp. 97-105.

S. Jaiswal, G. Iannaccone, C. Diot, J. Kurose and D. Towsley, "Measurement and Classification of Out-of-sequence Packets in Tier-1 IP Backbone," Proc. IEEE INFOCOM, Mar. 2003, pp. 1199-1209.

Chris Clark, Wenke Lee, David Schimmel, Didier Contis, Mohamed Koné and Ashley Thomas, "A Hardware Platform for Network Intrusion Detection and Prevention", Workshop on Network Processors & Applications—NP3, Feb. 14-15, 2004, Madrid, Spain.

Colleen Shannon, David Moore, k claffy, "Characteristics of Fragmented IP Traffic on Internet Links", *PAM2001—A workshop on Passive and Active Measurements, RIPE NCC*, (Amsterdam, Netherlands), 2001.

Thomas H. Ptacek; Timothy N. Newsham, "Insertion Evasion and Denial of Service Eluding Network Intrusion Detection", Secure Networks, Jan. 1998.

David V. Schuehler John Lockwood, "TCP-Splitter A TCPIP Flow Monitor in Reconfigurable Hardware", IEEE Micro, Jan./Feb. 2003.

David V. Schuehler, James Moscola, John Lockwood, "Architecture for a Hardware Based, TCP/IP Content Scanning System", Proceedings of Hot Interconnects 11 (HotI-11), Stanford, CA, Aug. 20-22, 2003, pp. 89-94.

J. Postel, J. Reynolds, "Telnet Protocol Specifications", RFC 854, May 1983.

J. Postel, J. Reynolds, "File Transfer Protocol (FTP)", RFC 959, May 1985.

P. Mockapetris, "Domain Names—Implementation and Specification", RFC 1035, Nov. 1987.

Sun Microsystems, "RPC: Remote Procedure Call Protocol Specification Version 2", RFC 1057, Jun. 1988.

J. Myers, M. Rose, "Post Office Protocol—Version 3", RFC 1939, May 1996.

R. Fielding, et. al, "Hypertext Transfer Protocol—HTTP/1.1", RFC 2616, Jun. 1999.

J. Klensin, "Simple Mail Transfer Protocol", RFC 2821, Apr. 2001.

David D. Clark, "IP Datagram Reassembly Algorithms", RFC 815, Jul. 1982.

http://www.ecsl.cs.sunysb.edu/elibrary/linux/network/iprecv4.pdf Internet pages, "IP Reassembly", downloaded on Oct. 19, 2004.

David Watson, Matthew Smart, G. Robert Malan, "Protocol Scrubbing: Network Security Through Transparent Flow Modification", IEEE/ACM Transactions on Networking, vol. 12, No. 2, Apr. 2004.

Matthew V. Mahoney et al., "PHAD: Packet Header Anomaly Detection for Identifying Hostile Network Traffic," Florida Institute of Technology Technical Report CS-2001-04, pp. 1-17.

Sun Microsystems, Inc., "RPC: Remote Procedure Call" RFC 1050, Apr. 1988.

http://www.syngress.com/book_catalog/244_snort/sample.pdf, "Preprocessors", Internet pages downloaded on Oct. 19, 2004.

* cited by examiner

SYSTEM AND METHOD FOR INTEGRATED HEADER, STATE, RATE AND CONTENT ANOMALY PREVENTION FOR DOMAIN NAME SERVICE

CROSS-REFERENCE TO RELATED APPLICATIONS

This is a continuation-in-part application of the U.S. patent application Ser. No. 11/021,637, filed Dec. 22, 2004, entitled "SYSTEM AND METHOD FOR INTEGRATED HEADER, STATE, RATE AND CONTENT ANOMALY PREVENTION WITH POLICY ENFORNCEMENT," which is incorporated herein by reference. This application also relates to a co-pending U.S. patent application Ser. No. 10/759,799, filed Jan. 15, 2004, entitled "METHOD AND APPARATUS FOR RATE BASED DENIAL OF SERVICE ATTACK DETECTION AND PREVENTION," which is incorporated herein by reference.

FIELD OF THE INVENTION

The present invention relates generally to intrusion prevention and more particular to a system and method for the prevention of denial of service attacks on Domain Name Service (DNS).

DESCRIPTION OF THE BACKGROUND ART

Intrusion prevention appliances have been widely available in the last few years. Published U.S. Patent Application Numbers 20030004688, 20030004689, 20030009699, 20030014662, 20030204632, 20030123452, 20030123447, 20030097557, and 20030041266 disclose systems, methods and techniques that primarily focused on content, header and state anomaly based intrusion prevention. Denial of Service attack prevention systems have also been dealt in the literature. Published US Patent Application Numbers 20030076848, 20030110274 and 20030070096, and 20020083175 disclose systems that prevent denial of service attacks or spoofed DNS messages.

As one skilled in the art knows, internet attacks have been growing in complexity and have been more wide-spread due to a variety of readily available attack toolkits. Many of the recent DoS or DDoS attacks have been on the DNS servers. By overloading the DNS servers, the attackers can easily deny access to the associated web-service or other related internet services. Clearly, a new method and system is needed to protect DNS servers from getting flooded with unwanted and illegitimate requests. The present invention addresses this need.

SUMMARY OF THE INVENTION

While it is impossible to predict the behavior of all types of future attacks, current trends in attacks lead to certain known categories of attacks, viz. pre-attack probes, header anomalies, state anomalies, rate anomalies and content anomalies.

The present invention provides a single appliance that integrates solutions to these different anomalies and provides an integrated solution to the rate based denial of service attacks, especially on the Domain Name Service.

The new appliance described herein provides copper and optical connectivity. A Packet Interface block interfaces with external network through a PHY and a MAC device and buffers packets until a decision has been made about them.

A Classifier interfaces with Packet interface to classifier. The Rate Anomaly Meters receive classifier output and maintain the instantaneous packet-rates and compare against the thresholds set adaptively and continuously by the controlling host.

If the specific type of packets exceeds the rate threshold, packets of that type or belonging to that group are discarded for a certain time period.

The anomaly engines drop packets that have header or state anomalies in different layers of protocol.

A fragment reassembly engine reassembles any fragments according to processes well-known in the art. Assembled or un-fragmented packets are then sent to an engine that removes any reordering issues or retransmission anomalies for TCP packets.

Ordered TCP as well as non-TCP packets are then sent to relevant protocol normalization engines. The derived layers 2, 3, 4 and 7 header-parameters and state information are then used by the Multi-rule search engine to find a rule-set that matches the incoming packet.

A rule-matching engine drives the content inspection engine to validate if contents of the packet match any of the anomalous signatures. A Stateful sub-rule traversal engine then validates if further contents of the packet meet sub-signatures of the rule.

If a rule match is found, it is added to the event queue corresponding to the packet. A packet may match multiple rules.

After all the rules matches have been performed, a decision multiplexer picks the highest priority rule match and informs the MAC interface whether to let the packet through or to drop the packet. Allowed packets are then sent out.

An object of the present invention is to provide a high-rate hardware based integrated system and method of preventing network packets across, the packets having

- layers 2, 3, 4, and 7 header anomalies and, more specifically, DNS header anomalies;
- layers 2, 3, 4, and 7 state transition and state based anomalies and, more specifically, DNS state transition anomalies;
- layers 2, 3, 4, and 7 rate anomalies as detected by the system, which is continuously and adaptively adjusting rate thresholds and, more specifically, DNS rate anomalies;
- characteristics of network probes or reconnaissance as detected by certain meters;
- content anomalies as defined by a set of content rules; or
- violation of network policies, as set by a system administrator.

Another object of the system is to provide a DNS classifier that is capable of classifying TCP and UDP based DNS packets and components of DNS protocol headers.

Still further object of the system is to provide a DNS Rate Anomaly Engine capable of continuously calculating the traffic rate on classified DNS parameters and estimating the traffic rate thresholds adaptively and thus determining the threshold violations on domain name service parameters such as queries and responses.

Another object of the system is to provide a DNS State Anomaly Engine that can selectively drop excessive packets during rate-based floods.

Yet another object of the system is to provide a DNS State Anomaly Engine that can validate DNS responses and that can drop them if there is no previous corresponding query associated with them.

Still another object of the system is to provide a DNS State Anomaly Engine that can drop certain DNS queries that are coming within the Time to Live period during DNS query floods from the same sources to the same destinations.

Another object of the system to use cached response, if available, rather than letting the query go to the Domain Name Server during DNS query floods.

Still another object of the system is to provide a method to determine any known content patterns of intrusion in domain name service protocol packets.

Still another object of the invention is to provide a method to determine any known policy violations on domain name service.

Still further objects and advantages of the present invention will become apparent to one skilled in the art upon reading and understanding the preferred embodiments described below with reference to the following drawings.

DETAILED DESCRIPTION

The present invention provides an integrated intrusion prevention solution for DNS related attacks. A single hardware based appliance integrates a plurality of mechanisms to prevent different anomalies and enables a policy based packet filter.

Figure 1:
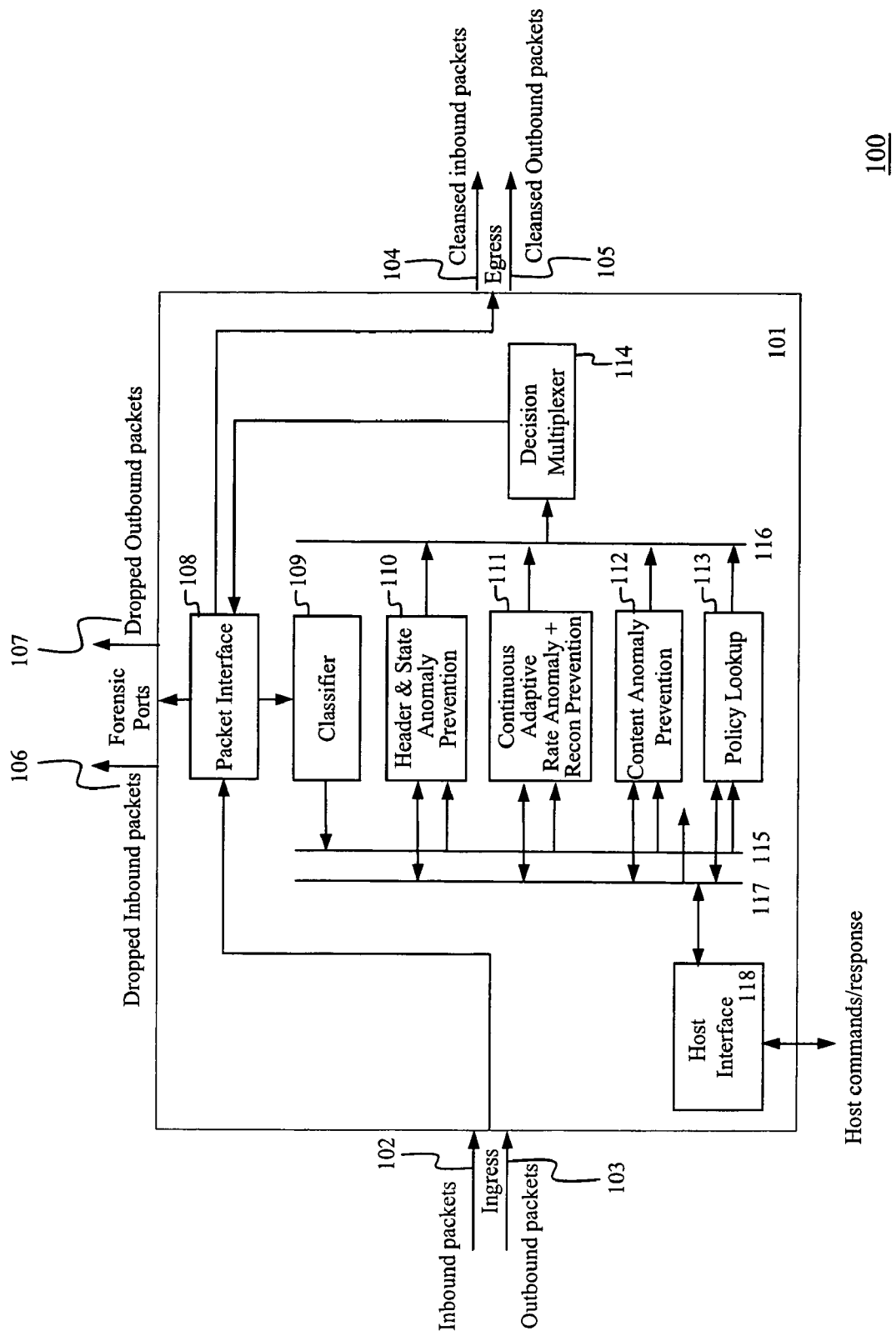
FIG. 1 illustrates an exemplary apparatus embodying the present invention.

FIG. 1 depicts an exemplary apparatus 101 illustrating the functionality of an integrated system 100 for the prevention of network attacks. The four main attack prevention components are the Header and State Anomaly Prevention 110, the Continuous Adaptive Rate Anomaly and Reconnaissance Prevention 111, the Content Anomaly Prevention 112, and the Policy Lookup Engine 113.

Network inbound packets 102 enter the apparatus 101 and exit as cleansed inbound packets 104. Similarly, network outbound packets 103 enter the apparatus 101 and exit as cleansed outbound packets 105. The dropped packets make the difference between packets at ingress and at egress. For the purpose of forensic analysis, these dropped packets are routed to two forensic ports viz. the Dropped Inbound Packets 106, and the Dropped Outbound Packets 107.

Packets entering the system 100 are buffered in the Packet Interface block 108. A copy of these packets is passed to the Classifier 109 which passes on the header and other relevant information over the Classification bus 115 to the subsequent blocks for decision making. The Packet Interface block 108 receives a multiplexed decision about each packet buffered within and either allows the packets or drops the packets. The drop packets are optionally copied to the forensic ports 106 and 107.

The decision making operation of determining which packets need to be dropped is handled by the four major blocks, viz. the Header and State Anomaly Prevention 110, the Rate Anomaly and Reconnaissance Prevention 111, the Content Anomaly Prevention 112, and the Policy Lookup Engine 113. They send the results to the Decision Multiplexer 114 via the Decision bus 116.

A controlling host uses the Host Interface 118 to read the controlling parameter and set the parameters of different blocks via the Host Interface Bus 117. The controlling host also reads events related to policy violations and anomalies. In some embodiments, these events are subsequently logged and/or analyzed.

The Header Anomaly Prevention block within 110 prevents packets that have layers 2, 3, 4 and 7 header anomalies according to protocols under consideration. For example, in an exemplary embodiment of this invention, layer 3 header anomaly prevention looks for packets that are marked IPV4 packets in layer 2 header but do not have version 4 in the IP header. Similarly, besides other anomalies, layer 4 header anomaly prevention block looks for TCP packets that have illegal flag combinations such as SYN and FIN set together. In an exemplary embodiment of this invention, the layer 7 header anomaly prevention block looks for anomalous behavior such as non-DNS traffic destined for port 53.

The State Anomaly Prevention block within 110 prevents packets that violate standard state transitions in protocols. In an exemplary embodiment of this invention, the layer 4 state anomaly prevention block prevents packets that do not belong to any established connection and have ACK bit on in the TCP flags. In an exemplary embodiment of this invention, the layer 7 state anomaly prevention block can optionally prevent DNS response packets that are arriving without the corresponding DNS query.

The Continuous and Adaptive Rate Anomaly Prevention block within 112 prevents instantaneous rate anomaly as detected through continuous and adaptive learning. In an exemplary embodiment of this invention, rate anomalies at network layers 2, 3, 4 and 7 are to be detected and prevented by this block. In an exemplary embodiment of this invention, DNS Query rate anomaly is prevented by detecting DNS Query packets exceeding their adaptively learnt threshold in a given direction.

The Reconnaissance Prevention block within 112 prevents reconnaissance (recon) activities. In an exemplary embodiment of this invention, as an example, one of the recon prevention schemes is implemented utilizing a port-scan counter.

The Content Anomaly Prevention block 112 prevents packets that match known signature of attacks in the application content of the packet. In an exemplary embodiment of this invention, these rules consist of signatures in the packet anywhere or within specifically parsed areas of the packets such as a DNS protocol payload. In an exemplary embodiment of this invention, the Content Anomaly Block 112 looks for a string "CD 80 E8 D7 FF FF FF|/bin/sh" to determine a DNS Exploit called "named overflow". In another exemplary embodiment of this invention, necessary packet normalization for accurate content inspection is supplemented with processing such as fragment reassembly, TCP assembly, reordering, retransmission removal, etc. The purpose of such normalization is to send normalized packets for content inspection.

The Policy Lookup engine 113 prevents packets that violate the network policies set by an administrator. In an exemplary embodiment, the policies are set by the administrator and include rules that allow or deny packets based on interface, source IP address, destination IP address, IPV4 or IPV6 protocol, source port, destination port, and/or ICMP type and code. In an exemplary embodiment, for DNS protocols, policies are available for a user to allow or deny packets with specific DNS parameters such as queries, responses, or specific values of QDCount, ANCount, NSCount, ARCount etc.

The Decision Multiplexer block 114 receives decisions from decision making blocks 110, 111, 112, and 113 over the Decision bus 116, combines them as a single decision, and forwards them to the Packet Interface block 108.

The controlling host can read the control registers and set them to manage the functionality of different components. The controlling host can periodically read the maximum packet rates of different types of packets to come up with an adaptive threshold and program them using the Host Interface Block 118. The Host Interface Block 118 accesses other blocks through the Host Interface Bus 117. The controlling host can also read the statistics related to packets being dropped due to anomalies or policy violation. The controlling host can then use this data for logging and analysis. In an exemplary embodiment, the controlling host can read the maximum packet rates for DNS Query packets or response packets in two directions and set the adaptive thresholds for them through the Host Interface Block 118.

Figure 2:
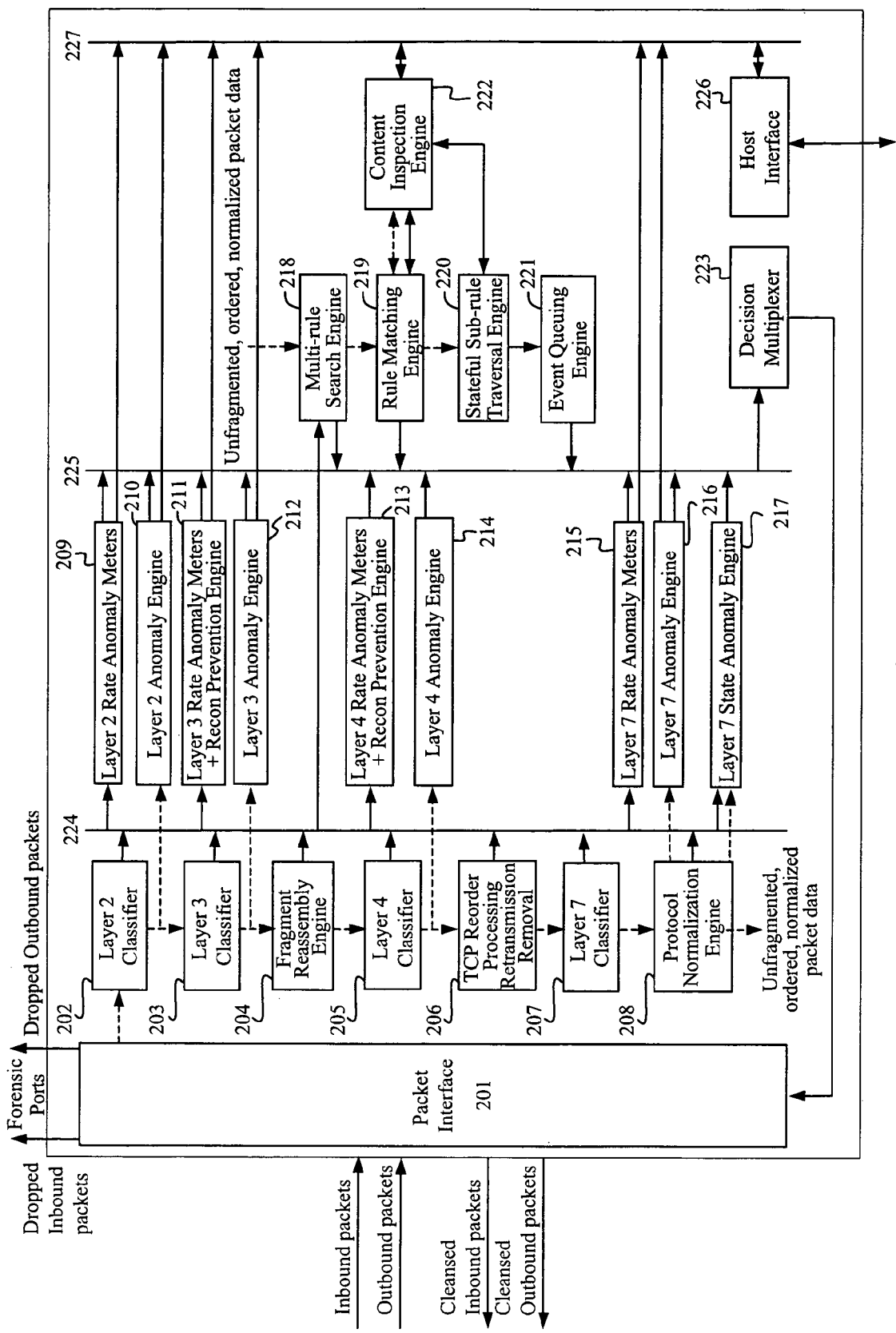
FIG. 2 schematically shows architectural details of FIG. 1, depicting some of the key components necessary to implement a system according to the present invention.

FIG. 2 illustrates further details of the system 100 from FIG. 1. Packet Interface 201 receives packets, buffers them, releases a copy of the packets to the subsequent logic, re-releases another copy of the packets held upon order from certain blocks, awaits decisions and subsequently either transmits them further or drops and/or transmits them on forensic ports.

The Classifier 109 is further illustrated in detail through the Layer 2 Classifier 202, the Layer 3 Classifier 203, the Fragment Reassembly Engine 204, the TCP Reorder Processing and Retransmission Removal Engine 205, the Layer 4 Classifier 206, the Layer 7 Classifier 207, and the Protocol Normalization Engine 208.

The Layer 2 Classifier 202 receives frames from Packet Interface 201 and classifies packets based on their layer 2 characteristics. It parses the layer 2 headers and passes that information to subsequent logic blocks over the Classification Bus 224. In an exemplary embodiment of this invention, this block can parse Ethernet frames and IEEE 802.2/3 frames and can determine ARP, RARP, Broadcast, Multicast, non-IP, VLAN tagged frames, and double encapsulated VLAN tagged frames.

The Layer 3 Classifier 203 receives packet data as well as layer 2 classifier information from the Layer 2 Classifier 202. It extracts the layer 3 header information in IPV4 and IPV6 headers and passes it on to the subsequent logic over the Classification Bus 224. In some embodiments of this invention, the Classifier parses IPV4 and IPV6 packets and determines properties such as TOS, IP Options, fragmentation, and protocol.

The Fragment Reassembly Engine 204 receives layer 3 header information from the Layer 3 Classifier 203 as well as the packet data. In cases where the Layer 3 Classifier 203 informs that this packet is a fragmented packet, the Fragment Reassembly Engine 204 requests the Packet Interface Block 201 to hold the packet. It also informs subsequent blocks not to inspect especially tagged fragmented packets, as they are not yet assembled. It stores the information about fragments in its internal data-structures related to reassembly. Packets that are not fragmented are passed through. A timeout based mechanism is then used to wait until all the fragments that belong together have been received. An ager based mechanism periodically wakes up and determines whether some fragments are over-age and discards them from memory.

Once the Fragment Reassembly Engine 204 determines that all fragments corresponding to one datagram are in-order and do not violate any fragmentation related anomalies, it requests the Packet Interface Engine 201 to re-release them in-order. These packets are then passed through the subsequent blocks in order for further inspection. The Fragment Reassembly Engine 204 therefore guarantees that blocks subsequent to it always receive datagram fragments in-order.

The Fragment Reassembly Engine 204 also determines whether there are fragmentation related anomalies and, if so, marks those packets as invalid and informs the decision to the Decision Multiplexer 223 over the Decision Bus 225. The techniques necessary to achieve fragment assembly as well as fragmentation related anomaly prevention are well known to those skilled in the art and thus are not further described herein. The allowed assembled packets leave as original unmodified packets with their own packet ID, but they leave the Fragment Reassembly Engine 204 in order so that subsequent blocks can inspect the content in order.

The Layer 4 Classifier 205, similarly, parses the layer 4 information from packets that are guaranteed to be in order with respect to fragmentation. In an exemplary embodiment, this classifier looks at TCP, UDP, ICMP, IPSec-ESP, and IPSec-AH headers. This information is passed to the subsequent blocks over the Classification Bus 224. In an exemplary embodiment of this invention, this classifier can parse layer 4 information such as TCP Options, TCP ports, UDP Ports, ICMP types/codes, TCP flags, sequence numbers, ACK numbers etc. Packets that are anomalous are dropped.

The TCP Reordering Processing and Retransmission Removal Engine 206 receives classified packets from the Layer 4 Classifier 205. It only monitors TCP packets and it passes the rest further to subsequent blocks for further inspection. It creates connection states in memory tables and ensures that packets follow well-known TCP state transitions. Packets that are anomalous are dropped through a decision sent over the Decision Bus 225 to the Decision Multiplexer 223. Preferably, this block further checks whether the packet's TCP sequence number is in order and within the receiver's window. Packets that are outside the window are dropped through the Decision Multiplexer 223. Packets that are in-order and not retransmissions are passed through.

For all packets within the window that have not been acknowledged yet, a CRC based checksum is saved as part of the state for the connection. It requests subsequent blocks not to inspect the packets which are out of order. It holds data structure related to such packets in memory. For every such packet stored in memory, a self-generated ACK is sent to the sender to facilitate quicker reordering. A timeout based mechanism is then used to wait until expected sequence number arrives for the connection. An ager based mechanism periodically wakes up and determines whether some packets are over-age and discards them from memory. The ordered packets are then passed through the subsequent blocks in order for further inspection. This way, the subsequent blocks can always assume that TCP packets will always be in-order.

The TCP Reordering Processing and Retransmission Removal Engine 206 also determines whether there are retransmission related anomalies and, if so, marks those packets as invalid and informs the decision to the Decision Multiplexer 223 over the Decision Bus 225. Retransmission anomalies are determined using the stored CRC based checksum. Retransmitted packets that are equal or larger than the previous transmission can be determined to be anomalous through a CRC comparison. Retransmissions that are smaller than earlier transmission are discarded. The techniques necessary to achieve TCP reordering as well as retransmission related anomaly prevention are well known to those skilled in the art and thus are not further described herein. The allowed ordered packets leave as original unmodified packets with their own packet ID, but they leave the engine 206 in order so that subsequent blocks can inspect the content in order.

The Layer 7 Classifier 207 receives ordered fragments of IP datagrams, ordered TCP packets, specially flagged TCP retransmissions and other packets, and parses layer 7 header information. In an exemplary embodiment of this invention, this block parses headers of protocols such as FTP, HTTP, TELNET, DNS, SMTP, POP, RPC, etc. It does so using stateful parsing techniques well-known to those aware of the art.

In an embodiment of this invention, the FTP classifier within 207 determines the commands and replies being used in the FTP packets. Commands parsed include USER, PASS, ACCT, CWD, CDUP, SMNT, REIN, QUIT, PORT, PASV, TYPE, STRU, MODE, RETR, STOR, STOU, APPE, ALLO, REST, RNFR, RNTO, ABOR, DELE, RMD, MKD, PWD, LIST, NLST, SITE, SYST, STAT, HELP, NOOP. 3-digit reply codes are parsed as well and grouped as positive and negative.

In an embodiment of this invention, the HTTP classifier within 207 determines the requests and replies being used in the HTTP packets. Requests are parsed as Method, Request-URI, Request-Header Fields, and HTTP-Version. The Method is further classified as OPTIONS, GET, HEAD, POST, PUT, DELETE, TRACE, CONNECT, and extension methods. The request URI is isolated and passed further. Request-Header Fields such as Accept-Charset, Accept-Encoding, Accept-Language, Authorization, Expect, From, Host, If-Match, If-Modified-Since, If-None-Match, If-Range, If-Unmodified-Since, Max-Forwards, Proxy-Authorization, Range, Referer, TE, User-Agent. 3-digit status codes are parsed as well and grouped as positive and negative.

In an embodiment of this invention, the TELNET classifier within 207 determines the telnet commands. The commands classified are SE, NOP, Data Mark, Break, Interrupt Process, Abort Output, Are you there, Erase character, Erase line, Go ahead, SB, WILL, Won't, Do, Don't and IAC.

In an embodiment of this invention, the TELNET classifier within 207 determines the telnet commands. The commands classified are SE, NOP, Data Mark, Break, Interrupt Process, Abort Output, Are you there, Erase character, Erase line, Go ahead, SB, WILL, Won't, Do, Don't and IAC.

In an embodiment of this invention, the DNS classifier within 207 parses the DNS queries. The parser breaks the DNS message into Header, Question, Answer, Authority, and Additional sections. The header is further parsed to determine whether the message is a query, response or some other code. The Question section is further parsed as QNAME, QTYPE and QCLASS. The Answer section is further classified as resource record (RR) consisting of Domain Name, Type, Class, TTL, and Resource data length.

In an embodiment of this invention, the SMTP classifier within 207 parses the SMTP commands and replies. The commands are further parsed as EHLO, HELO, MAIL, RCPT, DATA, RSET, VRFY, EXPN, HELP, NOOP, and QUIT. Replies are further decoded as positive and negative.

In an embodiment of this invention, the POP classifier within 207 parses the POP commands and responses. The commands are further parsed as USER, PASS, APOP, QUIT, STAT, LIST, RETR, DELE, NOOP, RSET, TOP, UIDL, and QUIT. Responses are further decoded as positive and negative.

In an embodiment of this invention, the RPC classifier within 207 parses the RPC message. The message is parsed as transaction id, followed by the call or reply. The call is further parsed as RPC version, program number, version number, procedure and the rest of the call body. The reply is further parsed as accepted or denied.

Protocol Normalization Engine 208 receives classified packets and normalizes the parsed data so that it can be inspected for content anomalies. In a preferred embodiment of the invention, the normalization is done for URI portion of the within HTTP. The normalizations include Hex-encoding, Double Percent Hex-encoding, Double Nibble Hex Encoding, First Nibble Hex Encoding, Second Nibble Hex Encoding, UTF-8 Encoding, UTF-8 Bare Byte Encoding, Unicode, Microsoft % U encoding, Alt-Unicode, Double encode, IIS Flip Slash, White-space, etc. In a preferred embodiment of this invention the normalization is done for RPC records by consolidating records broken into more than one record fragment into a single record fragment. In a preferred embodiment of this invention, the TELNET protocol normalization removes negotiation sequences. This normalization prunes negotiation code by copying all non-negotiation data from the packet. In a preferred embodiment of this invention, the TELNET normalization is also performed on the FTP packets.

The Continuous and Adaptive Rate Anomaly block within 111 is further illustrated in the Layer 2 Rate Anomaly Meters 209, the Layer 3 Rate Anomaly Meters 211, the Layer 4 Rate Anomaly Meters 213, and the Layer 7 Rate Anomaly Meters 215. The meters 209, 211, and 213 continuously and adaptively determine rate thresholds for layers 2, 3 and 4 network parameters and determine whether flood is occurring for any of the parameters. A controlling host uses the Host Interface 226 to learn the rate and set the threshold. All the meters support a two-way communication with the host through the Host Interface Bus 227. The above referenced co-pending U.S. patent application Ser. No. 10/759,799, entitled "METHOD AND APPARATUS FOR RATE BASED DENIAL OF SERVICE ATTACK DETECTION AND PREVENTION," discusses in detail how rate based denial of service attacks can be prevented using a continuous and adaptive learning approach for layers 2, 3 and 4 based attacks.

The Layer 7 Rate Anomaly Meters 215 continuously and adaptively determine rate thresholds for layer 7 network parameters and determine whether flood is occurring for any of the parameters. In an exemplary embodiment, the apparatus 201 can detect and prevent application layer floods such as HTTP Request Type Floods, HTTP Failure Floods, FTP Request Floods, FTP Failure Floods, DNS Query Floods, DNS Response Floods.

According to the invention, a DNS Query Rate Anomaly Meter prevents DNS query transactions from being used more often than the previously observed threshold. The Host Interface Bus 227 is used to inform the controlling host, via the Host Interface 226, of the continuous rates being learnt so that the controlling host can adaptively set the thresholds for layer 7 Rate Anomaly Meters 215.

The Recon Prevention sub-block within 111 is further illustrated in the Layer 3 Recon Prevention sub-block within 211 and the Layer 4 Recon Prevention sub-block within 213. The Layer 3 Recon Prevention sub-block within 211 prevents reconnaissance activity at layer 3. In an exemplary embodiment of this invention, this block prevents IP-address scanning, using information received from the layer 3 classifier and determines whether a single source is connecting to many IP addresses within a short interval. In another embodiment of this invention, this block prevents dark-address scanning, using information received from the layer 3 classifier and determines whether a source is scanning unused IP address ranges.

The Layer 4 Recon Prevention sub-block within 213 prevents reconnaissance activity at layer 4. In an exemplary embodiment of this invention, this block prevents port-scanning, using information received from the layer 3 and layer 4 classifiers and determines whether a single source is connecting to many layer 4 TCP/UDP ports within a short interval.

The Header and State Anomaly Prevention block within 110 is further illustrated in the Layer 2 Anomaly Engine 210, the Layer 3 Anomaly Engine 212, the Layer 4 Anomaly Engine 214, and the Layer 7 Anomaly Engine 216. The Engines 210, 212, 214 and 216 receive corresponding classifier outputs over the Classification Bus 224 and determine whether the header has any anomaly or whether the state transition due to header values leads to anomalies. The packets determined to be anomalous are dropped via a decision sent over the Decision Bus 225 to the Decision Multiplexer 223.

In some embodiments, the Layer 3 Anomaly Engine 212 detects and prevents IPV4 packets that have one or more of the following anomalies:
  invalid IP header checksum,
  version other than 4,
  source or destination equivalent to local host,
  same source and destination,
  end of packet before 20 bytes,
  end of packets before the length specified by total length,
  end of packet while parsing options,
  option length less than 3,
  time to live is 0,
  protocol corresponding to ipv6, etc.

In some embodiments, the Layer 3 Anomaly Engine 212 detects and prevents IPV6 packets that have one or more of the following anomalies:
  version other than 6,
  source or destination equivalent to local host,
  same source and destination,
  end of packet before the header,
  end of packet in the middle of the headers,
  end of packet while parsing options,
  same extension header occurring more than once,
  hop-limit of 0,
  Protocol corresponding to ipv4, etc.

In some embodiments, the Layer 3 Anomaly Engine 212 also prevents fragmented packets that have over assembly related anomalies as detected by Fragment Assembly Engine 204.

In some embodiments, the Layer 4 Anomaly Engine 214, detects and prevents TCP packets that have one or more of the following anomalies:
  data offset less than 5,
  TCP checksum error,
  illegal TCP flag combinations,
  urgent flag set, but urgent pointer is zero,
  end of packet before 20 bytes of TCP header,
  length field in window scale option is other than 3,
  TCP Option length is less than 2, etc.

In some embodiments, the Layer 4 State Anomaly Engine 214, detects and prevents UDP packets that have one or more of the following anomalies:
  optional UDP checksum error,
  end of packet before 8 bytes of UDP header, etc.

In some embodiments, the Layer 4 State Anomaly Engine 214 detects and prevents TCP packets that violate valid state transitions that are expected by standard TCP state machines. For this purpose, it receives information from the Layer 4 Classifier 205 and the TCP Reorder Processing and Retransmission Removal Engine 206. Packets that are outside the receiver's window as maintained by the state table are also dropped for being anomalous. Retransmitted packets that are determined by the Retransmission Removal engine 206 to be different from the original transmission are also dropped by the Layer 4 State Anomaly Engine 214.

In some embodiments, the Layer 7 Anomaly Engine 216 prevents state transition anomalies at layer 7 protocols such as HTTP, e.g., the GET keyword for request method must be followed by a URI. Similarly, the FTP protocol Anomaly Engine within 216 can identify requests that are within the allowed requests as defined in the RFC. In an exemplary embodiment of this invention, the DNS anomaly engine can prevent a DNS response without an associated DNS query. It can prevent DNS queries during rate-floods that are coming from the same source within the TTL period of previous valid DNS response.

The Content Anomaly Prevention block 112 is further illustrated via its sub-components Multi-Rule Search Engine 218, Rule Matching Engine 219, Stateful Sub-rule Traversal Engine 220, Event Queuing Engine 221, and Content Inspection Engine 222. The Multi-rule Search Engine 218 gets classification information from the Classification Bus 224. Part of this information, viz. Interface, Source IP Address, Destination IP Address, Protocol, Source Port, and Destination Port, is used to first search through a search engine to determine whether the packet violates any policies. If so, the packet is dropped through a decision conveyed over the Decision Bus 225 to the Decision Multiplexer 223.

If the search matches certain rules and requires further content inspection, the Rule Matching Engine 219 sends the assembled, ordered, normalized data to the Content Inspection Engine 222. An external host loads the contents of the BRAM, SRAM, and DRAM of the Content Inspection Engine 222 with necessary signatures corresponding to the rule-sets through the Host Interface 226 over the Host Interface Bus 227.

The Content Inspection Engine 222 can start the initial state at a specific point where the last match for the previous packet had occurred. This helps in statefully matching the strings across packets.

Once the Rule Matching Engine 219 determines, via the Content Inspection Engine 222, that the packet matches at least one of the signatures, it needs to statefully walk through all the optional sub-signatures within the rule. The statefulness is required because the signatures may be split across fragmented packets or reordered packets. For this purpose, the state of the last match where it was left is kept in the memory for the specific connection.

Once all signatures are found to be present in the packet, the rule is said to be matched. Such a match is denoted as an event. This event is queued against the packet's ID in the Event Queuing Engine 221.

A packet may match multiple such events. A priority scheme within the Event Queuing Engine 221 picks the highest priority event from the determined events for the packet and informs the corresponding decision to the Decision Multiplexer 223 over the Decision Bus 225.

Blocks such as 209, 210, 211, 212, 213, 214, 215, 216, 218, 219, and 221 inform of their decision, whether to drop the packet or not, to the Decision Multiplexer 223.

Figure 3:
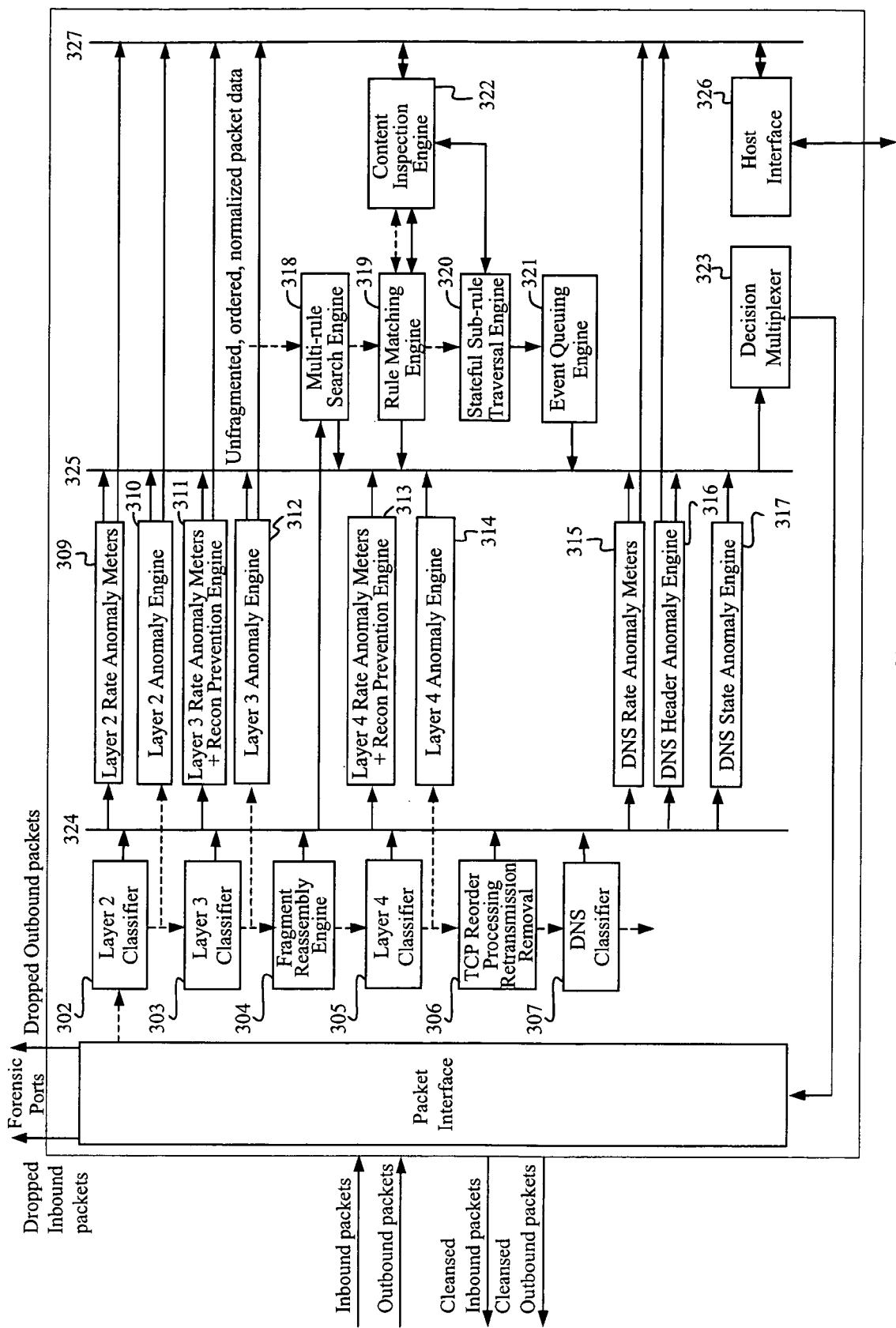
FIG. 3 illustrates further details of the specific implementation of DNS protocol related components within FIG. 2.

FIG. 3 further illustrates the details for Layer 7 classifier with an exemplary DNS Classifier 307. It similarly illustrates further details of the layer 7 rate anomaly meters 215, Layer 7 Anomaly Engine 216 and Layer 7 State Anomaly Engine 217.

In an exemplary embodiment, the DNS classifier 307 classifies all DNS packets over TCP or UDP by parsing them in detail. The DNS Classifier 307 identifies TCP/UDP DNS packets based on destination port, it classifies them into DNS queries and responses, identifies Question and Answer Resource Records (RRs), Authority RR fields, and Additional RR fields.

In an exemplary embodiment, the DNS Rate Anomaly Meter 315 detects rate anomalies for the following DNS packets:

Query Flood,
Response Flood,
Negative Response Flood,
Question Flood,
Answer Flood,
Authority Flood,
Additional Flood,
QTYPE Flood, and
Fragmented packets Flood.

The rate anomaly determination is done using continuous learning of rates which are passed to the host through the Host Interface 326. The host sets adaptive thresholds for the above floods.

The DNS Header Anomaly Engine 316 takes classified data from the DNS Classifier 307 and determines well-known anomalies such as following:

Label length too large: Label length is restricted to 63 bytes.
TCP message too long anomaly: This anomaly is asserted if the TCP length specified at the start of DNS header is more than the calculated packet length from the previous layer headers.
UDP message long anomaly: This anomaly is asserted if the calculated packet length is more than 512 bytes for a UDP DNS message.
Class not IN anomaly: If the class field of the DNS packet is not IN (=1), then this anomaly is asserted.
Pointer loop anomaly: This protocol anomaly is a DNS message with a set of DNS pointers that form a loop.
Zone Transfer Anomaly: This anomaly is asserted whenever QTYPE=252(AXFR).
Invalid OPCODE anomaly: This anomaly is asserted when the OPCODE assumes the invalid values (0, 2, 3, 4, 5).
Type ALL anomaly: This anomaly is asserted when QTYPE=255 (ALL).
QCLASS in Reply anomaly: This anomaly is asserted if the class field in a reply (QR=1) is 255.
QTYPE in Reply anomaly: If the QTYPE values reserved for queries are used in the reply resources (Answer, Authority, Additional RRs), then this anomaly is asserted. The reserved QTYPE values are 252(AXFR), 253(MAILB), 254(MAILA), 255(*ALL).
Query bit not set anomaly: This anomaly is asserted if the QR bit is not set in a reply. If QR=0 and ANCNT, NSCNT, ARCNT !=0, then this anomaly is asserted.
Query bit set anomaly: This anomaly is asserted if the QR bit is set in a DNS query. If QR=1 and ANCNT, NSCNT, ARCNT=0, then this anomaly is asserted.
Null query anomaly: If the QDCNT, ANCNT, NSCNT, ARCNT of a DNS query are zero, then this anomaly is asserted.
RA bit set anomaly: If the RA bit is set in a DNS query, then this anomaly is asserted.
Too long TTL anomaly: If the TTL value is greater than 7 days (or 604800 seconds), then this anomaly is asserted.

The DNS State Anomaly Engine 317 takes classified data from the DNS Classifier 307 and maintains statefulness in the state transitions. In an embodiment, the following state transition anomalies are determined:

Response without query anomaly: If a DNS response is seen without a corresponding query, then this anomaly is asserted. This ensures the prevention of spurious DNS responses.
Duplicate Query within TTL anomaly: If a duplicate DNS query is seen within a TTL period of a previous valid response, then this anomaly is asserted. This ensures the prevention of spurious queries during query floods.

The Multi-rule Search Engine 318, Rule Matching Engine 319, Stateful Sub-rule Traversal Engine 320, Event Queuing Engine 321 and Content Inspection Engine 322 work on the data received from the classifiers including DNS Classifier 307 to determine content anomalies through searching patterns of known intrusions on DNS service.

Figure 4:
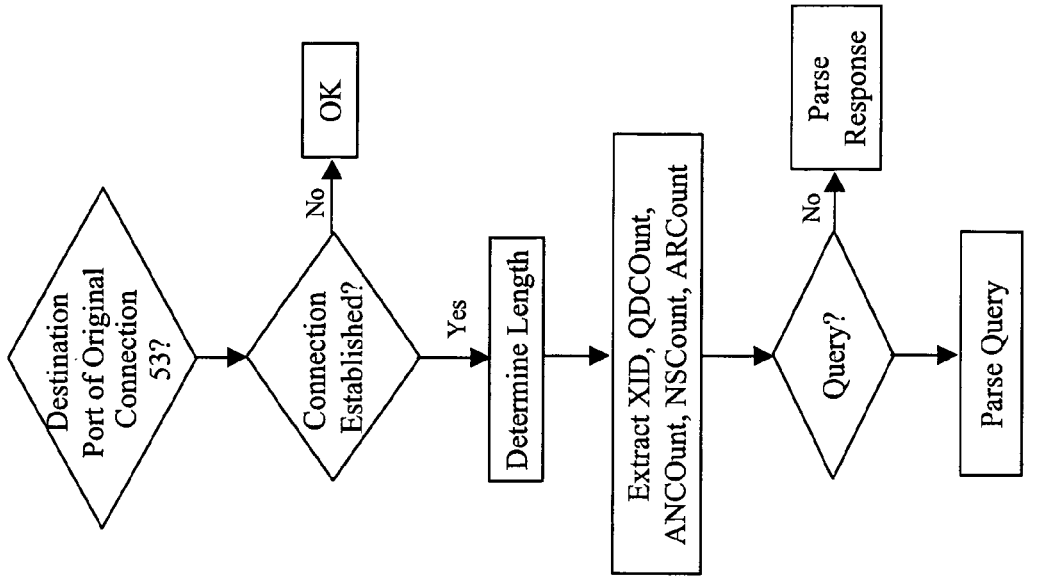
FIG. 4 illustrates parts of logic for classification of DNS packets over TCP and UDP within DNS Classifier in FIG. 3.
Figure 4:
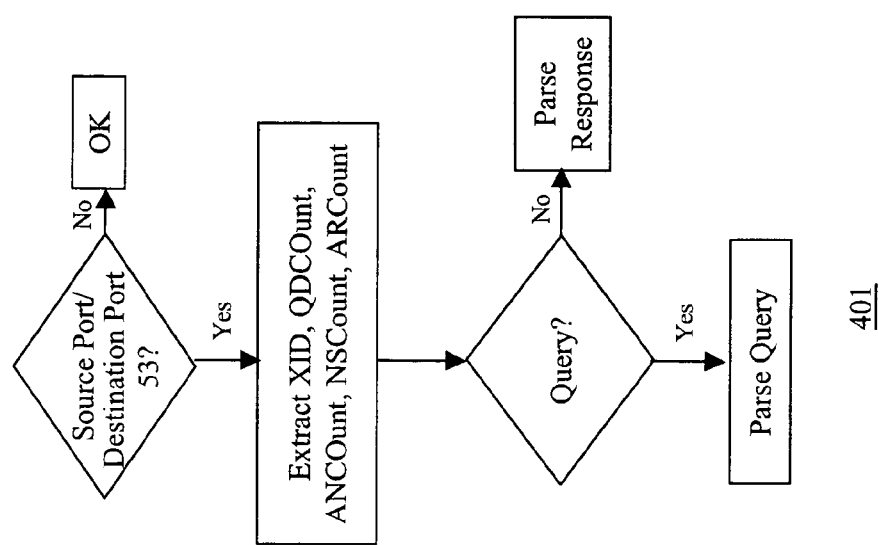

FIG. 4 further illustrates, via two flowcharts 401 and 402, the details of DNS Classifier 307. Flowchart 401 illustrates how DNS packets over UDP are parsed and flowchart 402 illustrates how DNS packets over TCP are parsed.

Flowchart 401 illustrates DNS parsing over User Datagram Protocol (UDP). This is performed within the DNS Classifier 307. If a UDP packet has a source or destination port equal to 53, it is considered for further parsing. All other packets are ignored by this block and are marked OK. Based on the positions, the Transaction ID (XID), QDCount, ANCount, NSCount, and ARCount are extracted per RFC. If the packet turns out to be a DNS query, it is parsed as a query otherwise it is parsed as a response. This is further illustrated in FIG. 6.

Flowchart 402 illustrates DNS parsing over Transmission Control Protocol (TCP). This is performed within the DNS Classifier 307. TCP state for the connection is queried and if the TCP connection has destination port equal to 53, it is considered for further parsing. All other packets are ignored by this block and are marked OK. Only connections that are established will have data in the layer 7. Until the connection establishment, the packets are ignored for further layer 7 parsing. Length is determined for the DNS packet based on the RFC. Based on the positions, the Transaction ID (XID), QDCount, ANCount, NSCount, and ARCount are extracted per RFC. If the packet turns out to be a DNS query, it is parsed as a query otherwise it is parsed as a response. This is further illustrated in FIG. 6.

Figure 5:
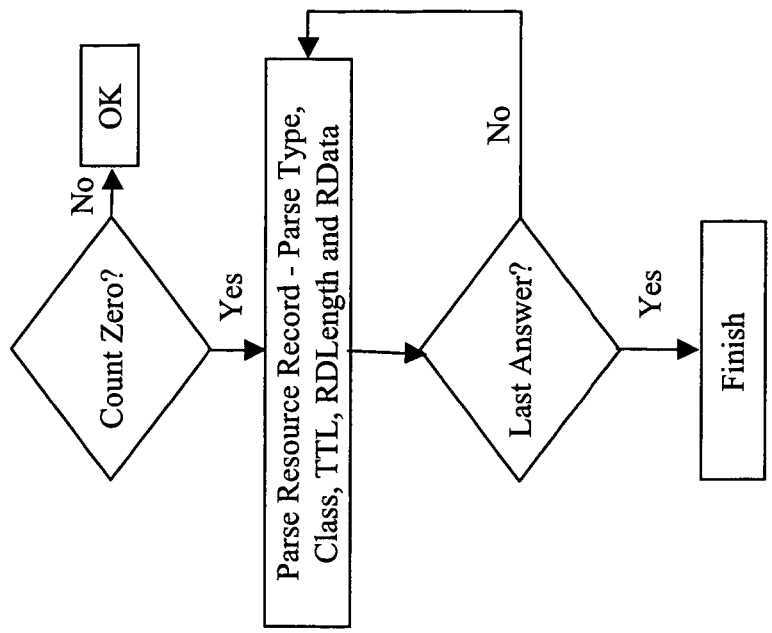
FIG. 5 illustrates parts of logic for classification of DNS questions and resource records within DNS Classifier in FIG. 3.
Figure 5:
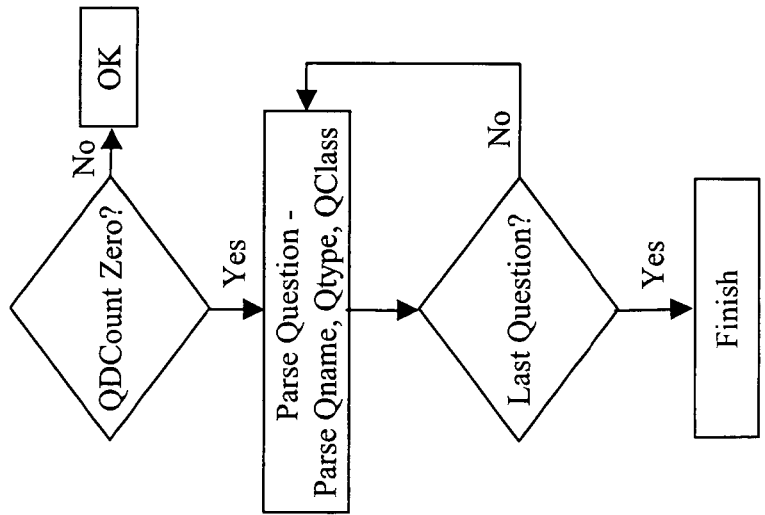

Every DNS packet has questions and resource records (RRs) FIG. 5 illustrates, via two flowcharts 501 and 502, the parsing of Questions and RRs done within the DNS Classifier 307. Flowchart 501 illustrates how Questions are parsed and flowchart 502 illustrates how RRs are parsed.

Flowchart 501 shows how the QDCount determined by the classifier is used. If it is non-zero, questions are present. For QDCount times, the questions are parsed. For every question, the QName, Qtype, and QClass are parsed and passed on to further meters and engines.

Flowchart 502 shows how the ANCount, NSCount, and ARCount determined by the classifier are used. If they are non-zero, RRs are present. For the corresponding count times, the resource records are parsed. For every resource record, the Type, Class, RDLength, and RData are parsed and passed on to further meters and engines.

During the above parsing within the DNS Classifier, some of the information generated is useful for determining header anomalies mentioned earlier. That information is passed on to DNS Header Anomaly Engine 316.

Figure 6:
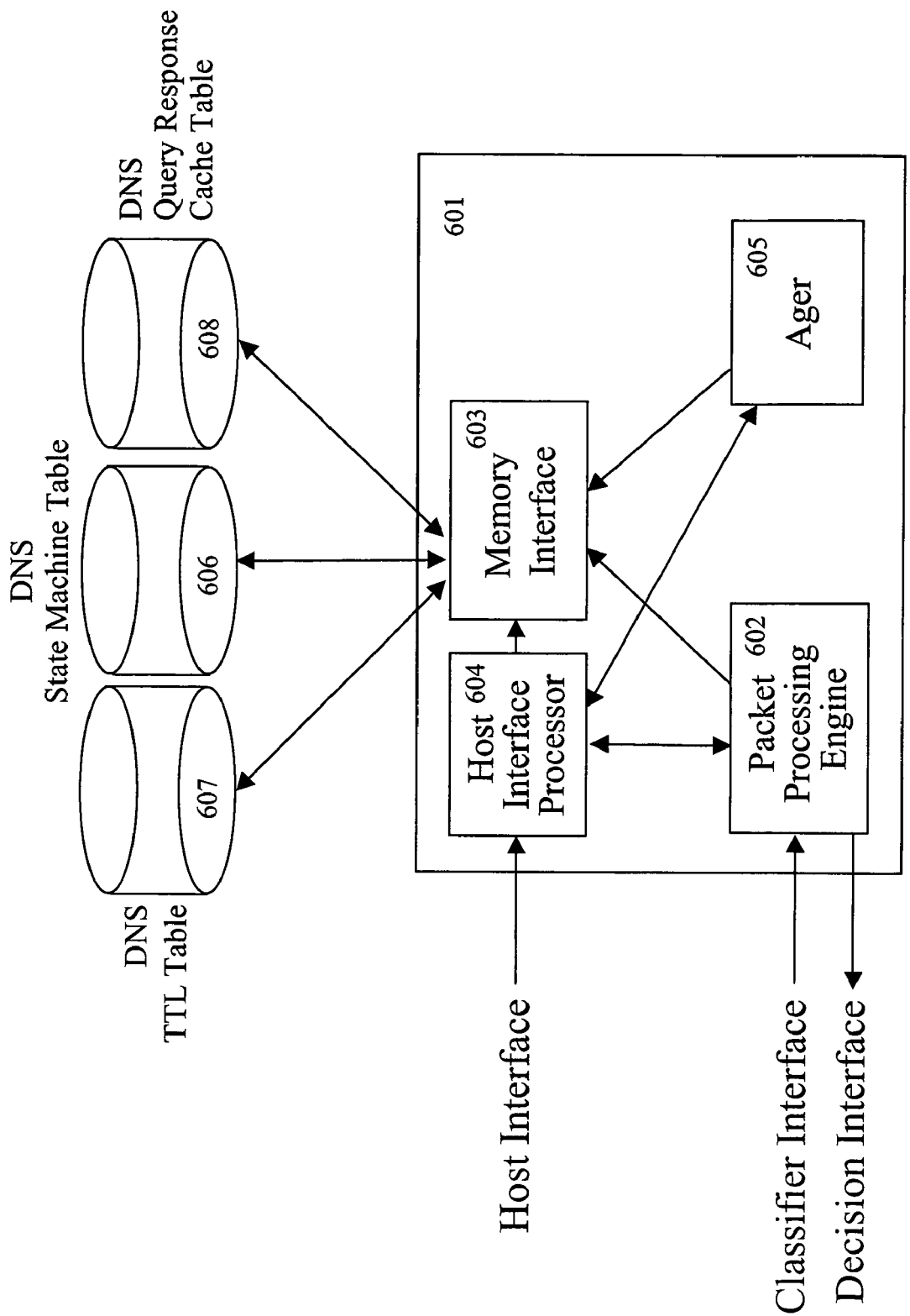
FIG. 6 illustrates details of DNS State Anomaly Engine in FIG. 3.

FIG. 6 further illustrates the details of DNS State Anomaly Engine 317. Once the DNS Rate Anomaly Engine 315 has determined that there is a rate flood associated with DNS, that information is passed on to DNS State Anomaly Engine 317. The Queries and responses are processed differently during flood and non-flood states to prevent overloading of the protected DNS service. This prevents excessive and attack packets from reaching the protected entity. Only selected packets are allowed to go further.

DNS State Anomaly Engine 601 consists of a Packet Processing Engine 602, a Memory Interface 603, a Host Interface Processor 604, an Ager 605, and three memory based tables viz. State Machine Table 606, TTL Table 607, and Query Response Cache Table 608.

The Packet Processing Engine 602 interfaces with Classifiers including the DNS Classifier 307 on one end and the Decision Multiplexer 323 on the other end. It decides whether a given packet should be allowed or dropped based on state of the system and several other factors discussed below.

The Memory Interface 603 allows controlled, shared and prioritized access to a high speed memory to the Packet Processing Engine 602, the Host Interface Processor 604, and the Ager 605.

The Host Interface Processor 604 allows the controlling host to control the parameters within the Packet Processing Engine 602, and read the statistics as well as initialize and manage the memory tables 606, 607, and 608.

The Ager 605 is capable of performing a timer-based aging of the memory tables 606, 607, and 608. This is further described below.

Table 1 describes the memory table 606. The key components of the table include a tuple consisting of Source IP, the Transaction ID (XID), and the Source Port (SPORT).

TABLE 1

DNS State Machine Table

| Name | Width in bits | Description |
| --- | --- | --- |
| SIP Type | 1 | 0: IPV4, 1: IPV6 |
| SIP | 128 | Source IP, Least significant 32 bits valid in case of IPV4 |
| SPORT | 16 | Source Port |
| XID | 16 | Transaction ID |
| Timeout | 16 | timeout allowed for a DNS response to come back after a query |
| Collision Pointer Valid | 1 | Collision pointer valid |
| Collision Pointer | 20 | Collision Pointer |

The DNS TTL Table shown in Table 2, is indexed using a tuple consisting of the Source IP, Destination IP (DIP), Record Type and the CRC of name. This tuple can subsequently be used during rate-based floods to validate another query coming form the same source to the same destination for the same record during the time to live (TTL) period.

TABLE 2

DNS TTL Table - Key Fields

| Name | Width in bits | Description |
| --- | --- | --- |
| SIP Type | 1 | 0: IPV4, 1: IPV6 |
| SIP | 128 | Source IP, Least significant 32 bits valid in case of IPV4 |
| DIP Type | 1 | 0: IPV4, 1: IPV6 |
| DIP | 128 | Destination IP, Least significant 32 bits valid in case of IPV4 |
| Record Type | 16 | Record Type of the RR |
| CRC of Name | 32 | Hash of Name (which can be up to 255 characters in width) |
| MSW-Name | 32 | First 4 bytes of the name (These are used to validate the above hash) |
| LSW-Name | 32 | Last 4 bytes of the name (These are used to validate the above hash) |
| TTL | 4 | Time Interval to live |
| CP Valid | 1 | Collision pointer valid |
| CP | 20 | Collision Pointer |

The DNS Query Response Cache Table shown in Table 3 is indexed using a tuple consisting of the Name, Type, and Class in response. This tuple can subsequently be used during rate-based floods to provide a response from the cache corresponding to a matching query coming for the same record. This avoids overloading the DNS server during the flood.

TABLE 3

DNS Query Response Cache Table - Key Fields

| Name | Width in bits | Description |
| --- | --- | --- |
| Name | 255 * 8 | Name in the query/response |
| Type | 16 | Type in the query/response |
| Class | 16 | Class in the query/response |
| TTL | 4 | Time Interval for this entry to live |
| Data Length | 16 | Length of all Rdata stored |
| Response Data | 512 * 8 | All data to be saved, and sent back as response |
| CP | 20 | Collision Pointer |

Preferably, all three tables are implemented using hashed indexes and collision pointers. Those skilled in the art can easily appreciate such implementations. Therefore, they are not further described herein in details.

The Ager 605 comprises a background process that runs every second. The background process periodically reads the above three tables. For every entry, it compares the time-out value with the free running second tick counter. If the time out is over, the entry is deleted. This ensures that stale entries do not populate the table. In some embodiments, the Ager 605 also collects statistics related to entries in the tables and sends them to host through the Host Interface Processor 604.

Figure 7:
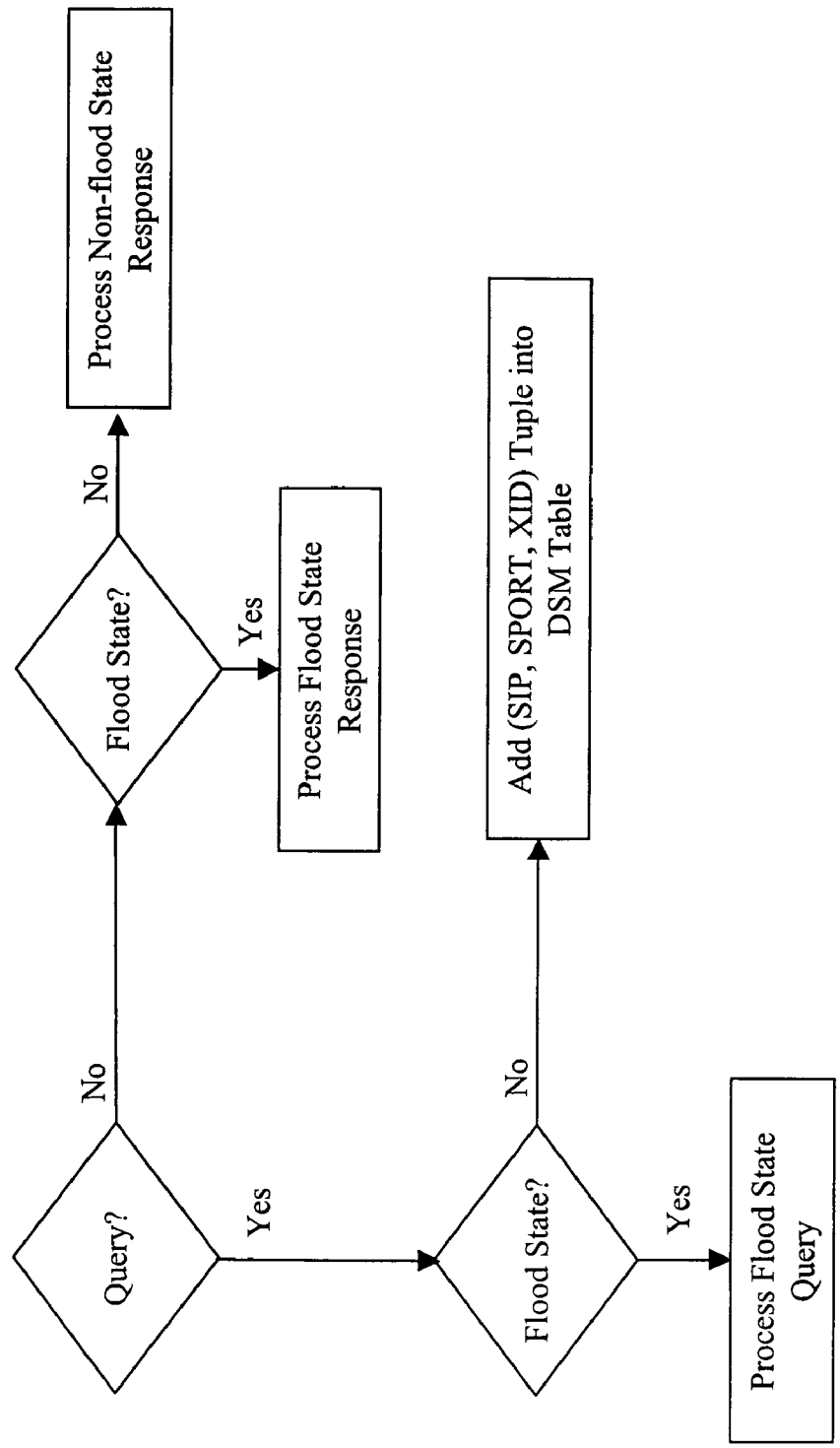
FIG. 7 illustrates parts of logic for determination of DNS state anomalies during normal and rate-flood situations in FIG. 3.

FIG. 7 further illustrates the details of Packet Processing Engine 602 within the DNS State Anomaly Engine 601. During the non-flood state, the DNS queries are added into a DNS State Machine table shown in Table 1. This tuple can subsequently be used during the response to validate the response.

Figure 8:
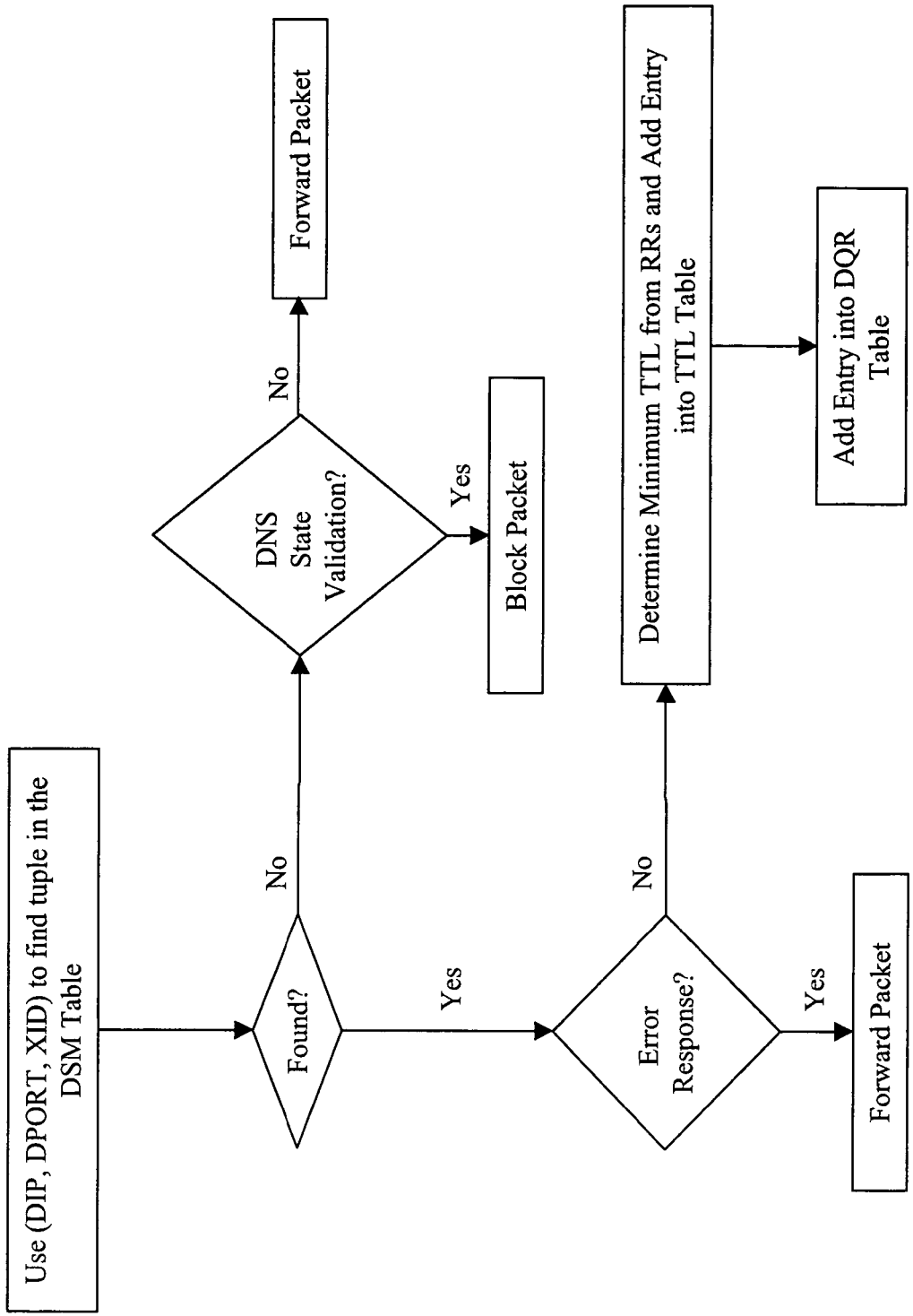
FIG. 8 illustrates parts of logic for processing of DNS response packets during normal and rate-flood situations in FIG. 3.

FIG. 8 further illustrates the details of Packet Processing Engine 602 within the DNS State Anomaly Engine 601. For a response packet, state validation is done by first finding the corresponding Query Tuple in the DNS State Machine table (Table 1).

If the corresponding query is not found, and the setting for state anomalies prevents passage of such packets, the packet is dropped through a decision passed through the Decision Bus 325 to Decision Multiplexer 323.

If the response is not an error response, an entry is added into the DNS TTL table (Table 2) and the response is added into the DNS Query Response Cache table (Table 3) for subsequent use.

Figure 9:
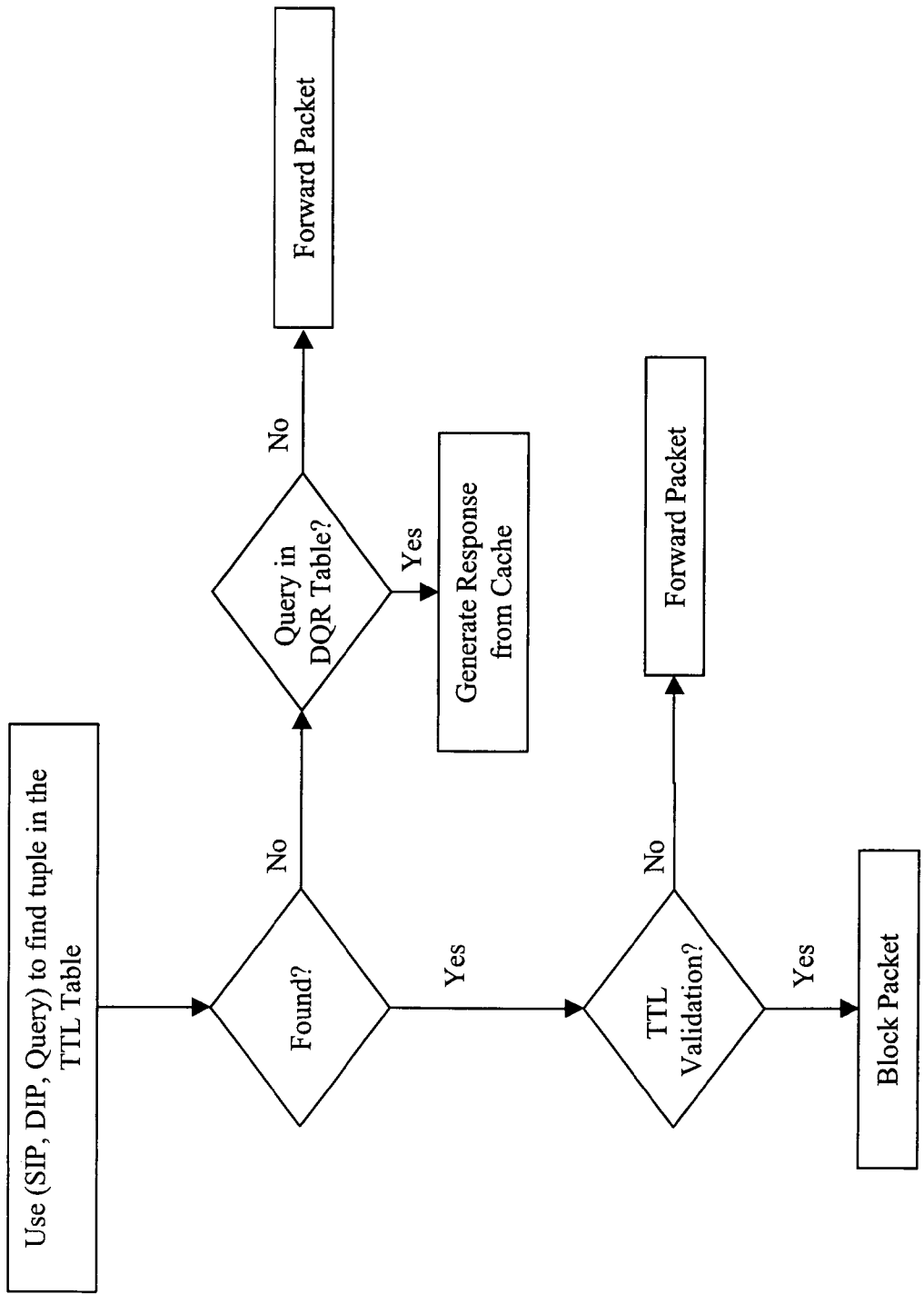
FIG. 9 illustrates parts of logic for determination of DNS state anomalies during non-rate-flood situations in FIG. 3 for DNS query packets.

FIG. 9 further illustrates the details of Packet Processing Engine 602 within the DNS State Anomaly Engine 601. During flood state, determined by the DNS Rate Anomaly Engine 315, DNS query packets are validated according this flowchart.

First, the SIP, DIP, record type, and CRC of name are used to find the corresponding tuple in Table 2. If the corresponding query is found, and the setting for TTL state anomalies prevents passage of such packets, the packet is dropped through a decision passed through the Decision Bus 325 to Decision Multiplexer 323. If the anomalies are allowed, the packet is forwarded.

If the query is not found in the TTL table, the same source has not requested the same query during the TTL period, and hence the response can be provided from the cache if it is present there. A search is made through the cache in Table 3. If the query is not present in the cache, the query is forwarded further to the destination.

The methods described above lead to the reduction of queries and responses reaching the DNS servers and thus advantageously reduce the load on the DNS servers during rate-based floods.

Although the present invention and its advantages have been described in detail, it should be understood that the present invention is not limited to or defined by what is shown or discussed herein.

Moreover, as one skilled in the art will appreciate, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

I claim:

1. An apparatus for enforcing network policies and preventing attacks related to header, state, rate and content anomalies, wherein the attacks include Domain Name Service (DNS) attacks, said apparatus comprising:
   a) a Packet Interface that is programmed for
      receiving inbound/outbound packets,
      storing the packets in a memory buffer,
      releasing the packet with a packet-id to subsequent blocks for inspection,
      dropping the packets altogether, and
      sending the packets onto forensic ports based on a unified decision;
   b) a Classifier that comprises a DNS Classifier, that is coupled to the Packet Interface, and that is programmed for classifying packets received from the Packet Interface and retrieving layer 2, layer 3, layer 4, and layer 7 header information from the packets;
   c) a Header and State Anomaly Prevention Engine that comprises a DNS State Anomaly Engine, that is coupled to the Classifier via a classification bus, and that is programmed for determining layers 2, 3, 4, and 7 header and state anomalies;
   d) a Continuous and Adaptive Rate Anomaly Prevention Engine that comprises a DNS Rate Anomaly Engine, that is coupled to the classification bus, and that is programmed for determining and estimating rate thresholds for layers 2, 3, 4, and 7 parameters and subsequently determining rate anomalies for these parameters;
   e) a Recon Prevention Engine that is coupled to the classification bus and programmed for determining recon activities at layers 3 and 4;
   f) a Content Anomaly Engine that comprises a DNS Content Anomaly Engine, that is coupled to the classification bus, and that is programmed for determining known attacks using signatures including on Domain Name Service;
   g) a Policy Lookup Engine that comprises a DNS Policy Engine, that is coupled to the classification bus, and that is programmed for determining policy violation in packets; and
   h) a Decision Multiplexer for generating the unified decision about a packet-id based on information received from a plurality of sources including the Header and State Anomaly Prevention Engine, the Continuous and Adaptive Rate Anomaly Prevention Engine, the Recon Prevention Engine, the Content Anomaly Engine, and the Policy Lookup Engine.

2. The apparatus of claim 1, further comprising:
   a host interface for setting necessary data structures in memory of logic blocks through host commands.

3. The apparatus of claim 1, further comprising:
   copper interfaces, fiber interfaces, or a combination of both, through which the Packet Interface receives the inbound/outbound packets.

4. The apparatus of claim 1, wherein the Classifier further comprises:
   layers 2, 3, 4, and 7 classifiers, wherein the DNS classifier is a layer 7 classifier;
   a Fragment Reassembly Engine for assembling the packets;

a Transmission Control Protocol (TCP) Reorder Processing and Retransmission Removal Engine for ordering the assembled packets; and a Protocol Normalization Engine for normalizing the ordered packets.

5. The apparatus of claim 4, wherein
the Fragment Reassembly Engine performs fragment reassembly to accurately classify packets at layer 4; and wherein
the Fragment Reassembly Engine provides statistics for rate anomalies for fragmented packets and header anomalies for packets with fragmentation related anomalies.

6. The apparatus of claim 5, wherein
the TCP Reorder Processing and Retransmission Removal Engine performs TCP reordering and retransmission removal at layer 4 to accurately classify fragment-assembled packets for content inspection at layer 7; and wherein
the TCP Reorder Processing and Retransmission Removal Engine operates to isolate packets with retransmission anomalies.

7. The apparatus of claim 6, wherein
the Protocol Normalization Engine performs protocol normalization on the assembled and ordered packets to accurately classify these packets for content inspection at layer 7; and wherein
the Protocol Normalization Engine operates to isolate packets with content anomalies.

8. The apparatus of claim 4, further comprising:
a Multi-rule Search Engine for isolating a rule-set that matches a given packet among a set of rules based on the given packet's network parameters identified by the layer 2, 3, 4 and 7 classifiers;
a Rule Matching Engine for validating each rule from the rule-set identified by Multi-rule Search Engine;
a Content Inspection Engine for providing necessary stateful content inspection;
a Stateful Sub-rule Traversal Engine operating along with the Rule Matching Engine and the Content Inspection Engine to statefully parse signatures across the packets and validate packets that match all signatures; and
an Event Queuing Engine for the Rule Matching Engine to deposit events related to content matches, the Event Queuing Engine later combines and prioritizes all events for a given packet and outputs a corresponding decision to the Decision Multiplexer.

9. The apparatus of claim 1, further comprising:
a Layer 2 Rate Anomaly Meter for detecting and preventing Layer 2 rate anomalies in layer 2 parameters;
a Layer 3 Rate Anomaly Meter for detecting and preventing Layer 3 rate anomalies in layer 3 parameters;
a Layer 4 Rate Anomaly Meter for detecting and preventing Layer 4 rate anomalies in layer 4 parameters; and
a Layer 7 Rate Anomaly Meter for detecting and preventing Layer 7 rate anomalies in layer 7 parameters.

10. The apparatus of claim 9, wherein
layer 2 parameters include Address Resource Protocol (ARP), Reverse ARP (RARP), Broadcast, Multicast, Non-Internet Protocol (IP), Virtual Local Area Network (VLAN), and Double Encapsulated VLAN;
layer 3 parameters include Source, Destination, Type of Service (TOS), IP Options, Fragmented Packets, and Protocols;
layer 4 parameters include TCP Ports, User Datagram Protocol (UDP) Ports, Internet Control Message Protocol (ICMP) Type/Codes, synchronization (SYN) packets, and Connection Rates; and
layer 7 parameters include Hyper-Text Transfer Protocol (HTTP) Requests, HTTP Replies, File Transfer Protocol (FTP) Requests, FTP Replies, TELNET commands and replies, Domain Name Service (DNS) queries and replies, Simple Mail Transfer Protocol (SMTP) commands and replies, Postal Office Protocol (POP) commands and replies, and Remote Procedure Call (RPC) methods and replies.

11. A system for enforcing network policies and preventing attacks related to header, state, rate and content anomalies, wherein the attacks include Domain Name Service (DNS) attacks, said system comprising:
a controlling host;
an apparatus coupled to the controlling host, comprising:
a) a Packet Interface for
receiving inbound/outbound packets,
storing the packets in a memory buffer,
releasing the packet with a packet-id to subsequent blocks for inspection,
dropping the packets altogether, and
sending the packets onto forensic ports based on a unified decision;
b) a Classifier that comprises a DNS Classifier, that is coupled to the Packet Interface, and that is programmed for classifying packets received from the Packet Interface and retrieving layer 2, layer 3, layer 4, and layer 7 header information from the packets;
c) a Header and State Anomaly Prevention Engine that comprises a DNS State Anomaly Engine, that is coupled to the Classifier via a classification bus, and that is programmed for determining layers 2, 3, 4, and 7 header and state anomalies;
d) a Continuous and Adaptive Rate Anomaly Prevention Engine that comprises a DNS Rate Anomaly Engine, that is coupled to the classification bus, and that is programmed for determining and estimating rate thresholds for layers 2, 3, 4, and 7 parameters and subsequently determining rate anomalies for these parameters;
e) a Recon Prevention Engine that is coupled to the classification bus and programmed for determining recon activities at layers 3 and 4;
f) a Content Anomaly Engine that comprises a DNS Content Anomaly Engine, that is coupled to the classification bus, and that is programmed for determining known attacks using signatures;
g) a Policy Lookup Engine that comprises a DNS Policy Engine, that is coupled to the classification bus, and that is programmed for determining policy violation in packets; and
h) a Decision Multiplexer for generating the unified decision about a packet-id based on information received from a plurality of sources including the Header and State Anomaly Prevention Engine, the Continuous and Adaptive Rate Anomaly Prevention Engine, the Recon Prevention Engine, the Content Anomaly Engine, and the Policy Lookup Engine; and
i) a host interface for setting necessary data structures in memory of logic blocks through host commands.

12. The system of claim 11, wherein the Classifier further comprises:
layers 2, 3, 4, and 7 classifiers;
a Fragment Reassembly Engine for assembling the packets and providing statistics for rate anomalies for fragmented packets and header anomalies for packets with fragmentation related anomalies;

a TCP Reorder Processing and Retransmission Removal Engine for ordering the packets and isolating packets with retransmission anomalies; and a Protocol Normalization Engine for normalizing the packets and isolating packets with content anomalies.

13. The system of claim 11, further comprising:

a Layer 2 Rate Anomaly Meter for detecting and preventing Layer 2 rate anomalies in layer 2 parameters; wherein layer 2 parameters include ARP, RARP, Broadcast, Multicast, Non-IP, VLAN, and Double Encapsulated VLAN;

a Layer 3 Rate Anomaly Meter for detecting and preventing Layer 3 rate anomalies in layer 3 parameters; wherein layer 3 parameters include Source, Destination, TOS, IP Options, Fragmented Packets, and Protocols;

a Layer 4 Rate Anomaly Meter for detecting and preventing Layer 4 rate anomalies in layer 4 parameters; wherein layer 4 parameters include TCP Ports, UDP Ports, ICMP Type/Codes, SYN packets, and Connection Rates; and a Layer 7 Rate Anomaly Meter for detecting and preventing Layer 7 rate anomalies in layer 7 parameters; wherein layer 7 parameters include Hyper-Text Transfer Protocol (HTTP) Requests, HTTP Replies, File Transfer Protocol (FTP) Requests, FTP Replies, TELNET commands and replies, DNS queries and replies, Simple Mail Transfer Protocol (SMTP) commands and replies, Postal Office Protocol (POP) commands and replies, and Remote Procedure Call (RPC) methods and replies.

14. The system of claim 11, wherein the DNS classifier is programmed for classifying TCP and UDP based DNS packets and components of DNS protocol headers.

15. The system of claim 11, wherein the DNS Rate Anomaly Engine is capable of continuously calculating the traffic rate on classified DNS parameters and estimating traffic rate thresholds adaptively and thus determining threshold violations on the DNS parameters including DNS queries and responses.

16. The system of claim 15, wherein the DNS State Anomaly Engine interacts with the DNS Rate Anomaly Engine and uses state information in packets to selectively drop excessive packets during rate-based floods.

17. The system of claim 16, wherein the DNS State Anomaly Engine validates responses via a DNS state machine table and drops the responses if there is no previous corresponding query associated therewith.

18. The system of claim 15, wherein the DNS State Anomaly Engine consults a DNS Time to Live (TTL) table to drop certain DNS queries that are coming within the TTL period during DNS query floods from the same sources to the same destinations.

19. The system of claim 15, wherein the DNS State Anomaly Engine consults a DNS Query Response Cache table for a cached response so that a DNS query does not go to the Domain Name Server during DNS query floods.

20. The system of claim 11, wherein the DNS Content Anomaly Engine utilizes classified DNS data to determine known content patterns of intrusion.

21. The system of claim 11, wherein the DNS Policy Anomaly Engine utilizes classified DNS data to determine known policy violations on domain name service.

* * * * *